Dec. 20, 1927.

J. B. PERRIN ET AL 1,653,119

DEVICE FOR FORMING FAR REACHING SOUND PENCILS AND APPLICATION OF LATTER

Filed July 16, 1925     3 Sheets-Sheet 1

Inventors
J. B. Perrin,
A. J. Marcelin
and
H. L. M. J. Benard
By Marks & Clerk
attorneys

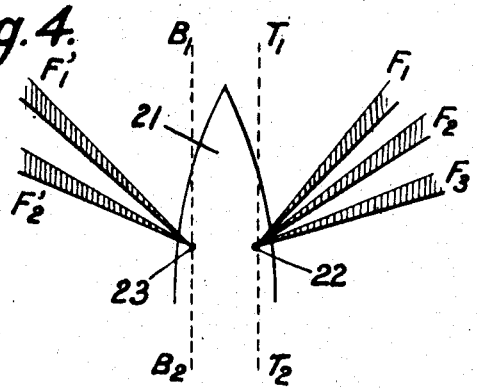
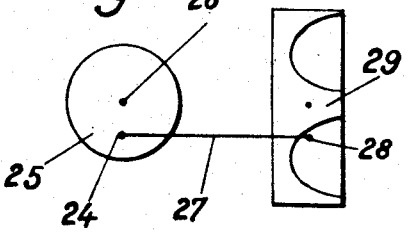
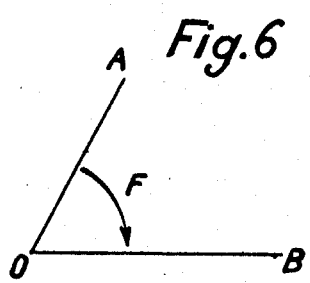
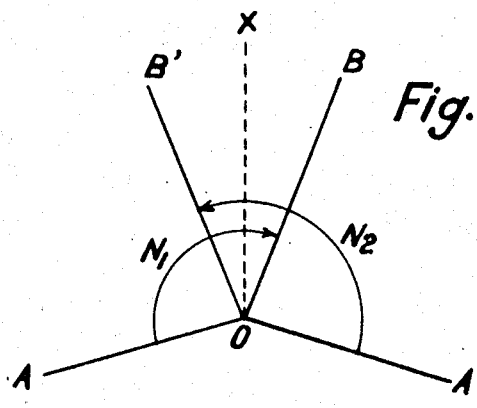
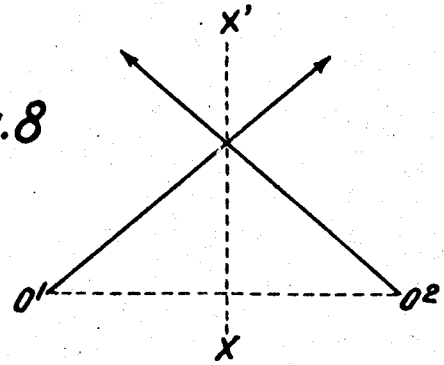
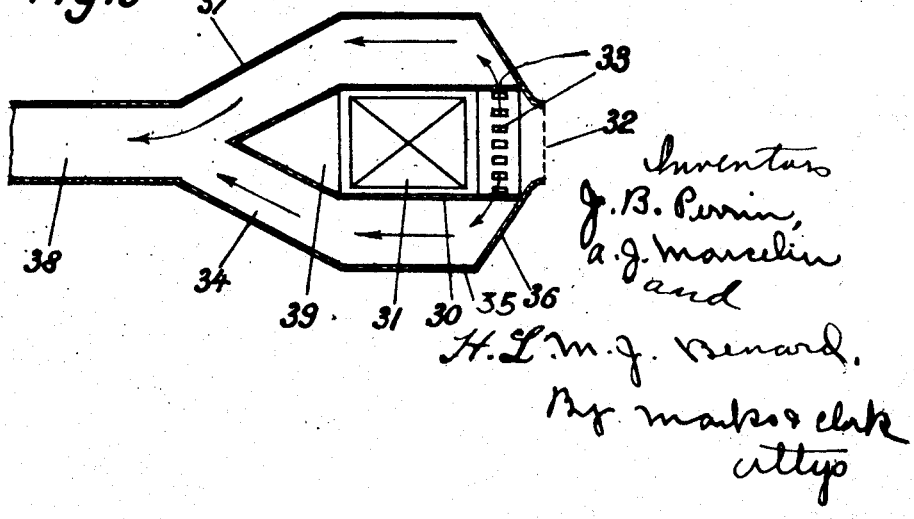

Dec. 20, 1927.  
J. B. PERRIN ET AL  
1,653,119  
DEVICE FOR FORMING FAR REACHING SOUND PENCILS AND APPLICATION OF LATTER  
Filed July 16, 1925
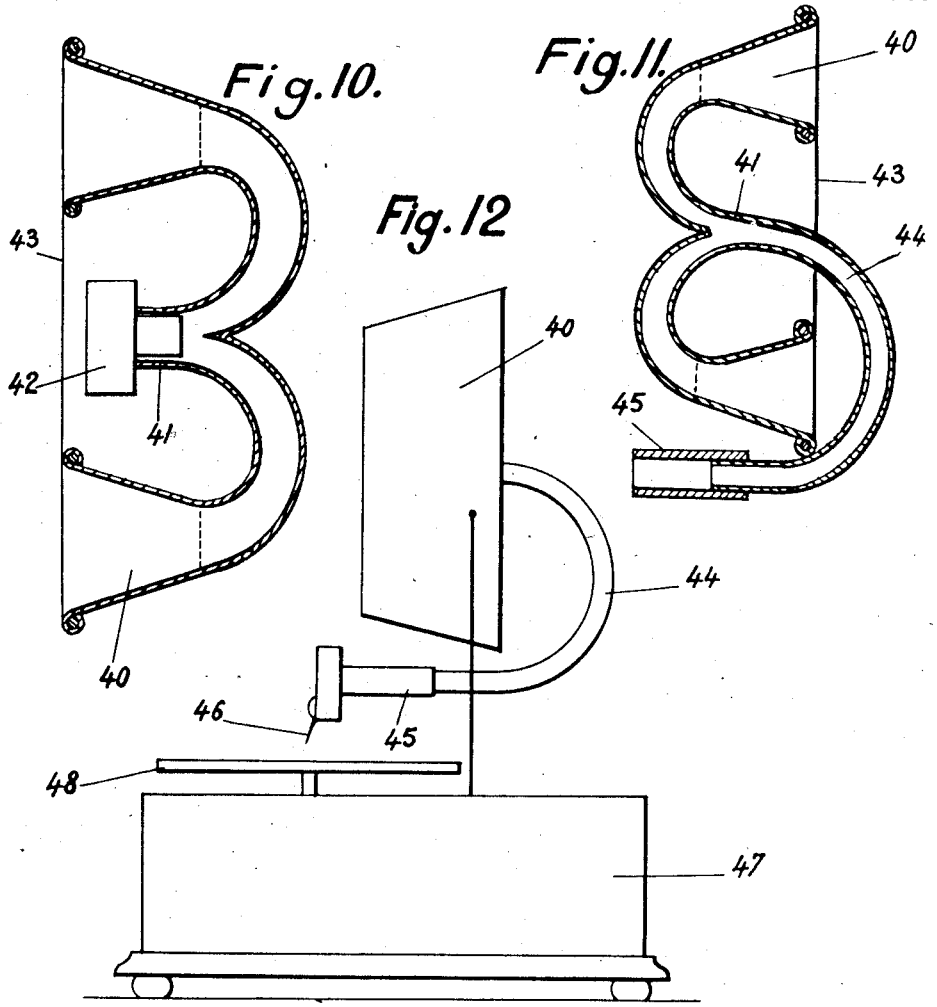
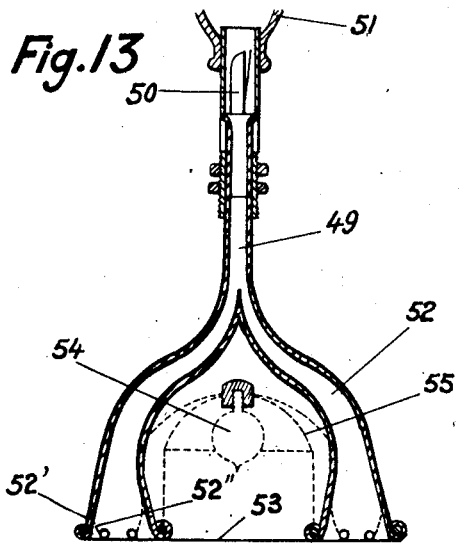
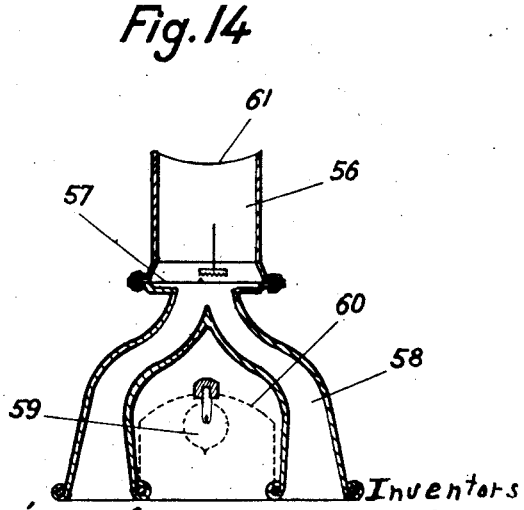

Patented Dec. 20, 1927.

1,653,119

UNITED STATES PATENT OFFICE.

JEAN-BAPTISTE PERRIN, ANDRÉ JULES MARCELIN, AND HENRI LUGLIEN MARIE JOSEPH BÉNARD, OF PARIS, FRANCE.

DEVICE FOR FORMING FAR-REACHING SOUND PENCILS AND APPLICATION OF LATTER.

Application filed July 16, 1925, Serial No. 44,059, and in France July 21, 1924.

Present invention has for its object a device for guiding a sound emission and giving it a greater reach by concentrating its energy in a given direction. This provides for the formation of a sort of a sound pencil. The invention has also for its object several applications of this sound pencil.

The sound is transmitted through a tube, length and diameter of which are adapted to the pitch of the sound, from the source up to an acoustic device which changes the natural spherical wave which would normally bear the sound through the air into a wave shape of which is chosen (at least at the start) and is preferably flat.

This can be done by bringing the sound from the end of the tube which is the farthest from the source up to different points of a suitable surface, by paths of equal length so that the sound enters the atmosphere in phase on the different points of this surface which determines the shape of the sonorous wave at the start.

This wave can be given a spherical (concave or convex) a cylindrical or a flat shape.

In latter case, more particularly, the same arguments as those given in optics for explaining diffraction can be used whereby the formation of a sound pencil can be foreseen and its size calculated.

In its applications, the sound pencil can either move in a plane or in all directions or be stationary. It can sweep all or part of a plane or of space. Suitably disposed screens can provide at will for silent zones.

Two or more moving or stationary sound pencils can start from the same source. Their axes can coincide or else be shifted by a variable or stationary angle. They can rotate in the same or in opposite directions.

Two pencils having the same origin and rotating with equal speeds in opposite directions coincide periodically along one same direction characterized for the observer by the synchronism of the two perceptions.

Two pencils can be distinguished one from the other by the pitch or pitches of the sound transmitted, by its strength, by the angle made with a given direction, or by the alternation of the rotation of the pencils or of the sound emissions.

The sound pencil allows very frequent alternations of sound and silence in chosen points if deflected periodically away from this point, the sound being nevertheless emitted continuously by the source at a stated frequency; this is very advantageous, especially when electric fog-horns are used.

In short all the combinations known or used in the case of light houses comprising isolated lights or a number of lights of different colours, steady or revolving, providing for simple or combined flashes, can be used with the sound pencils. Thus low sounds of a given note can be used in lieu of red lights and high sounds of green lights, with any number of intermediary well defined sounds between these.

The theory shows that a secondary pencil can be produced in the direction opposite to that of the principal pencil; this secondary pencil is done away with or weakened by giving the periphery of the emitting surface, a suitable chosen or calculated shape which must not be a circle round the axis of the principal pencil and is preferably square.

The advantages of the invention will be given hereunder with the description of the appended drawings which show by way of example several forms of execution of the invention and several applications thereof.

Fig. 4 shows a group of the pencils described as used on board a ship and oscillating round a point.

Fig. 5 shows by way of example, how this oscillating movement can be obtained.

Figs. 6 and 7 are diagrammatical figures relating to a form of execution wherein each pencil sweeps a given angular sector by rotating with a uniform speed.

Fig. 8 is a modification of Fig. 7 wherein the two pencils come from different sources.

Fig. 9 shows by way of example, a special form of execution of an electric turbine fog-horn acting as the sound-emitting source.

Fig. 10 shows this device applied to a wireless receiving post.

Figs. 11 and 12 relate to the application to a phonograph.

Fig. 13 relates to the application to an ordinary automobile horn.

Fig. 14 relates to the application to an electromagnetic horn.

Figure 1:
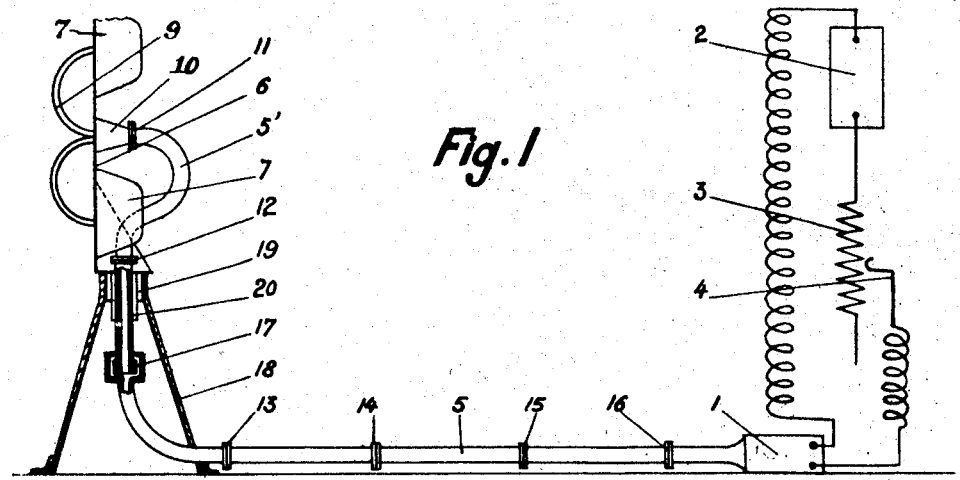
Fig. 1 is a diagrammatical view of the whole device, the sound being given out by a fog-horn actuated by a small electric motor.

According to Fig. 1 the fog-horn 1 is actuated by a small electric motor fed by a supply 2 provided with a resistance 3 along which an index 4 can be moved so as to control the pitch of the sound emitted by the fog-horn.

Latter is connected through a long tube 5 with the device emitting the flat wave. This device comprises in the example depicted on Figs. 1 and 2, four cells such as 7, each of which comprises a surface of revolution such as will oblige the different fractional waves passing through the tube 9 to move by paths of equal length before arriving at the basis of the surface of revolution.

Figure 2:
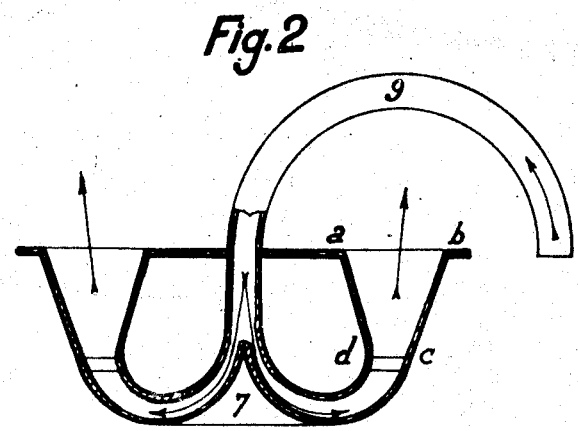
Fig. 2 is a section through one of the acoustic paths of equal length which lead the sound from one end to the tube connected with the source to the surface from which the sound is transmitted.
Figure 3:
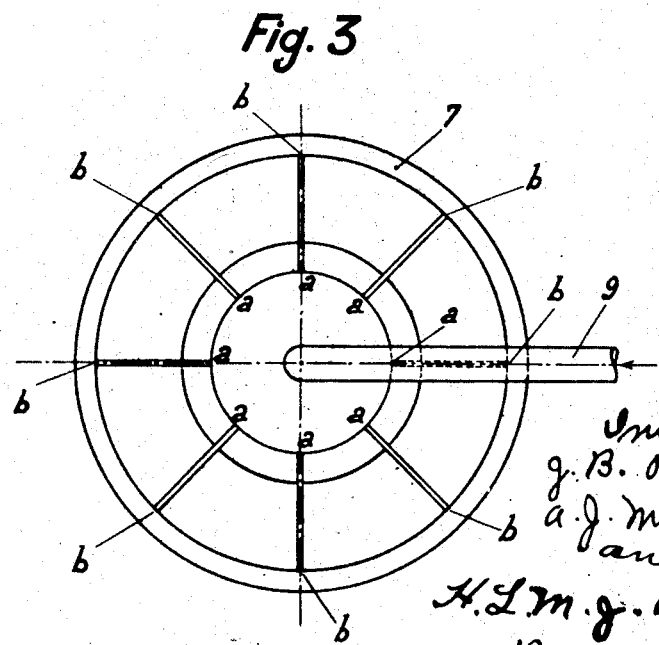
Fig. 3 is a front view of one of the circular cells adapted for emitting a flat wave.

The interior of this surface is divided by a suitable number (six or eight for instance) of radial plane partitions such as $a$—$b$, $c$—$d$ (Figs. 2 and 3). The four tubes such as 9 all start from a general collector 10 wherein ends the tube 5. The tubes 9 must have exactly the same length.

The tube 5 connecting the device emitting flat waves to the fog-horn comprises a certain number of segments connected by the stationary threaded connections 11, 12, 13, 14, 15, 16. Moreover a rotating connection 17 provided if necessary with a ball bearing allows the part 5' of the tube 5 which is the nearest to the wave transmitter to rotate by 360°, the rest of the tube 5 remaining stationary so as to allow the said transmitter to be directed in all azimuths.

The flat wave emitting device is borne by a support 18 top part of which bears a sleeve 19 wherein a spindle 20 can rotate. This spindle is secured to the tube 5.

When the apparatus is used, the plane of emission can be set in a given direction wherein the sound will be diffused almost exclusively. Or else this plane of emission can be rotated so as to make the sound pencil sweep a plane.

By modifying the above described device through using either a supple tube or a tube provided with two rectangular axial articulations, the pencil can be easily set in any direction of space.

In order that the size of the apparatus should suit the desired pitch of sound and the opening or field of the pencil, the source of the sound can be chosen and also the length and diameter of the tube 5. Latter may comprise a sliding part for finishing the adjustment, the number, size and opening diameter of the acoustic cells, the synchronous transmitting surface, its curvature, the shape of its periphery can also be modified for controlling the pitch of the sound and the field of the sound pencil.

The sound projector which is the object of the invention can project one or more pencils oscillating round a point so as to sweep a space inside a given angle and to leave a region in silence. A form of execution of such a projector is given by way of example on appended Figure 4.

On starboard of the ship 21 is disposed at 22 a device adapted to send forth three pencils $F^1$, $F^2$, $F^3$ which can sweep an angle of 180° for instance between the directions $T^1$ $T^2$; on larboard at 23 another device is disposed which transmits two pencils $F'_1$ $F'_2$ oscillating between the directions $B_1$ $B_2$.

This provides for the following advantages with reference to the pencils movable in all directions described hereinbefore.

1. It allows a longer sound emission for an equal number of passages of the sound pencil or pencils in a given direction, the time of emission being for instance double when the sweeping angle is 180° as on the example shown.

2. When used on a ship if the pitch of the sound in the several pencils $F_1$ $F_2$ $F_3$ of the same group is different whereby the sound of each pencil can be easily recognized, the time between the passage of each of these three pencils in front of an observer gives latter the head of the ship. Thus if the times between two passages are equal it shows the observer is on the bisector of the sweeping angle, that is abreast the ship. If the two groups $F_1$ $F_2$ $F_3$ and $F_3$ $F_2$ $F_1$ are heard in quick succession it means the observer is nearer fore than aft. Reversely of the groups $F_3$ $F_2$ $F_1$ and $F_1$ $F_2$ $F_3$ are heard in quick succession, it means the observer is nearer aft than fore.

Thus the problem of the position and of the direction of the ship is quite solved.

The acoustic device can be caused to oscillate by any suitable means. A form of execution of such means is shown diagrammatically by way of example on appended Figure 5.

In a suitably excentered point 24 of a circular plate 25, rotating round its center 26, a rod 27 is pivoted, the other extremity of said rod being pivoted in a suitably excentered point 28 of the device 29 for transmitting the guided waves.

Fig. 7 shows an example of the use of the combination of two pencils moving constantly in opposite directions.

A first sound pencil starting from O and frequency of which is $N_1$ moves with a uniform speed along the sector A O B; a second sound pencil also starting from O but having a frequency $N_2$ moves with a uniform speed in a direction opposite to that of the first pencil along the sector A' O B'.

The two pencils start respectively from O A and O A' and arrive respectively at O B and O B' at the same time. The two sectors swept by the pencils overlap and have in common the sector B O B', the two pencils crossing each other along O X, bisector of the angle B O B'. The several regions of the plane are thus characterized as follows:

Sector A' O A: Silence.

Sector A O B': Only the pencil $N_1$ is heard.

Sector B' O X: The two pencils are heard in quick succession in the order $N_1 N_2$.

Along O X: The two sounds are heard simultaneously.

Sector X O B: The two pencils are heard in quick succession in the order $N_2 N_1$.

Sector B O A': The pencil $N_2$ is heard alone.

Of course the angular values of these several sectors can be modified at will according to the aim one has in view.

In case the device is used on board a ship, the direction O X will coincide with the fore direction of the axis of the ship, the aft direction coinciding with the bisector of the silent sector A O A'.

If the apparatus is used on the coast, the silent sector will take up a continental area and the direction O X will show the ships a direction which they are to either follow or avoid according to the conventions made.

If desired, the two sounds $N_1 N_2$ can be made more easily distinguishable by giving one of them an interrupted characteristic for instance through using a hollow core provided with suitable openings and rotating at a suitable speed.

The diagrammatical Fig. 8 relates to a modification wherein the two pencils have a different source, the pencil $N_1$ being produced by $O_1$ and $N_2$ by $O_2$. The coincidence of the two sounds appears to the observer when latter is on the line X' X which is perpendicular to the line $O_1 O_2$ in its middle.

The source of the sound emitted used as explained hereinabove can be of any suitable kind; for instance it can comprise an electric fog-horn as stated above. Fig. 9 shows a form of execution of an electric turbine fog-horn sending the sound produced into a tube.

This fog-horn comprises a shut casing 30 wherein are located a motor 31 and a turbine (not shown). When the fog-horn is started, the air is sucked through 32 at the end of the casing 30 and is driven on through the openings 33 disposed on the periphery of the casing 30.

Latter is disposed inside a chamber 34 surface of which is of revolution; its cylindrical walls 35 are connected on one hand with the suction side of the casing 30 by means of a frusto-conical part 36 disposed laterally with reference to the openings 33 and on the other hand through a suitably sloping part 37 to a pipe 38 disposed in front of the axis of the casing 30. The sound emitted by the fog-horn is thus reflected by the frusto-conical part 36 and sent into the pipe 38. In order to avoid the eddies which might alter the sound, the casing 30 shows a conical projection 39 on its front wall, the sides whereof are parallel to the wall 37 of the chamber 34.

The fog-horn could be replaced by any other suitable source of sound, for instance, by a fog-horn actuated by compressed air or by steam, by a bell, by an apparatus such as a bugle or by any apparatus transforming into audible vibrations electric or electromagnetic vibrations such as a telephone vibrating plate whereof is adapted to transmit signals received by radio, etc.

The device as described hereinabove can be used for a great number of purposes of which only a few are given hereinafter by way of example.

1. Sound projector for emitting signals chiefly in foggy weather. The projector can be stationary or else revolve according as to whether the device transmitting the guided sounds is stationary or adapted to revolve.

2. Acoustic telegraphy using Morse signals for instance, the sound projector being directed towards a given receiving station; the necessary modulations can be obtained by opening or closing for instance the entrance of air into the fog-horn.

3. Signalling and alarm device between two distant points of a railway line, of a large plant, of a farm, etc. with the expenditure of very little power.

4. Checking of the direction and of the head of a ship provided for instance with two sound projectors on starboard and larboard or on fore and aft.

5. Falling in of several ships sailing together.

6. Grouping of a number of sound projectors protected by iron frames electrically controlled from a central control station in foggy weather for allowing the sea-farers to check the angular directions of these projectors and thereby to find their way into a port, along a fairway in a dangerous part, along a river, etc.

Fig. 10 shows the device as used at a receiving station for wireless.

The acoustic device for emitting flat waves is shown in 40 and is provided with a certain number, 6 for instance, of radial partitions. The central tube 41 is connected directly with a microphone 42 disposed at the center of the device. A plate 43 forced into the opening of the device closes it.

The Figs. 11 and 12 relate to the application of the device to a phonograph. On the central tube 41 of the surface of revolution 40 is fitted a suitably curved tube 44 ending with a rubber connection 45; this connection is secured to the needle 46 of the phonograph 47, rotating record of which is shown in 48.

The device according to invention can also be used with alarm signals such as automobile horns, electromagnetic horns, etc.

Fig. 13 relates to the application to an ordinary automobile horn. The tube 49 provided with a reed-pipe 50 and with a rubber bottle 51 expands at 52 into a surface of revolution. The edge of the bell thus formed can either be wide open as shown in full lines at 52' or else narrowed in as showed in dotted lines at 52". The free central part of the horn can be closed by a plate 53. It can also be used for receiving a light projector comprising a lamp 54 and a reflector 55.

Lastly Fig. 14 shows the invention as used with an electromagnetic horn, the rear part 56 of the device receives the motor, the electromagnetic mechanism or other device which causes the plate 57 to vibrate. The acoustic waves produced by latter are received in a surface of revolution 58 similar to that shown on Fig. 13 and also adapted to receive in its center a light projector constituted by the lamp 59 and the reflector 60. The rear part of the alarm device turned towards the driver can receive a mirror 61 for allowing the driver to watch the road behind him.

What we claim is:

1. A device for producing sound pencils comprising a source of acoustic waves, a collector connected with the said source, a series of sound emitting cells bounded by two substantially cup shaped surfaces of revolution, the several cells opening into the atmosphere along annular surfaces all disposed in one plane, and tubes of equal length connecting the collector with the different cells.

2. A device for producing sound pencils comprising an electric motor, a turbine fog-horn actuated by said motor, a casing bounded by a surface of revolution enclosing the fog-horn and through which the sound produced by the fog-horn is adapted to pass, a stationary tube connected with said casing, a rotatable tube connected therewith, a collector borne by said rotatable tube and connected therewith, a series of sound-emitting cells adapted to rotate with the rotatable tube and bounded by two substantially cup shaped surfaces of revolution, the several cells opening into the atmosphere along annular surfaces all disposed in one plane, and tubes of equal length connecting the collector with the different cells.

3. A device for producing sound pencils comprising a source of acoustic waves, a stationary tube leading from said source, a rotatable tube connected therewith, a collector borne by said rotatable tube and connected therewith, a series of sound-emitting cells adapted to rotate with the rotatable tube and bounded by two substantially cup shaped surfaces of revolution, the several cells opening into the atmosphere along annular surfaces all disposed in one plane, tubes of equal length connecting the collector with the different cells and means for making the rotatable part of the device move to and fro in a continuous manner between two given angular directions.

4. An arrangement comprising two devices as claimed in claim 2 and means for making the rotatable parts of the two devices move to and fro with a uniform speed between two given angular directions, the sectors swept between these couples of given directions being overlapping and respectively travelled over at any moment in opposite directions.

In testimony whereof we affix our signatures.

JEAN-BAPTISTE PERRIN.
ANDRÉ JULES MARCELIN.
HENRI LUGLIEN MARIE JOSEPH BÉNARD.